(12) United States Patent
LaSusa (10) Patent No.: US 7,935,211 B2
(45) Date of Patent: May 3, 2011

(54) CORNER JOINERY SYSTEM AND METHOD FOR PVC WINDOWS AND POLYMERIC SUBSTRATES USED IN BUILDING PRODUCTS

(76) Inventor: Frank LaSusa, Layton, UT (US)

( * ) Notice: Subject to any disclaimer, the term of this patent is extended or adjusted under 35 U.S.C. 154(b) by 82 days.

(21) Appl. No.: 12/314,119

(22) Filed: Dec. 4, 2008

(65) Prior Publication Data

US 2009/0145544 A1 Jun. 11, 2009

Related U.S. Application Data

(60) Provisional application No. 60/996,781, filed on Dec. 5, 2007.

(51) Int. Cl.
*B32B 65/18* (2006.01)
*B32B 65/74* (2006.01)

(52) U.S. Cl. ....... 156/258; 156/73.5; 156/211; 156/217; 156/227; 156/304.6; 156/512; 156/517; 52/204.5

(58) Field of Classification Search ................ 156/73.5, 156/211, 217, 227, 258, 304.6, 308.2, 530, 156/513, 512, 517; 228/142, 171, 213, 196; 219/78.15; 29/897; 83/34, 404.2, 917; 52/204.5
See application file for complete search history.

(56) References Cited

U.S. PATENT DOCUMENTS

| | | | | |
|---|---|---|---|---|
| 451,089 A * | 4/1891 | Wagoner | ............................ | 83/765 |
| 1,836,354 A * | 12/1931 | Abrams | ........................ | 228/142 |
| 2,219,595 A * | 10/1940 | Lang | ............................. | 228/142 |
| 3,038,252 A * | 6/1962 | Turek | ............................. | 228/142 |
| 3,305,998 A * | 2/1967 | Deisenroth | .................. | 52/656.6 |
| 3,440,711 A * | 4/1969 | Roper | ............................. | 228/142 |
| 4,284,464 A * | 8/1981 | Forster | ........................... | 156/510 |
| 4,909,892 A * | 3/1990 | Quinn et al. | .................. | 156/499 |
| 5,006,198 A * | 4/1991 | Pasquini | ........................ | 156/559 |
| 5,370,835 A * | 12/1994 | Sturtz | ........................... | 264/248 |
| 5,753,065 A * | 5/1998 | Buzzelli | ...................... | 156/304.6 |
| 5,913,786 A * | 6/1999 | Mayer | .......................... | 52/204.7 |
| 5,938,888 A | 8/1999 | Valentin | | |
| 6,273,988 B1 * | 8/2001 | Zollinger et al. | .......... | 156/304.2 |
| 7,354,227 B2 * | 4/2008 | Ramnauth et al. | .............. | 408/69 |
| 7,490,445 B2 * | 2/2009 | Steffek et al. | .................... | 52/456 |
| 2006/0065358 A1 * | 3/2006 | Cupp | ............................. | 156/267 |

* cited by examiner

*Primary Examiner* — Linda L Gray
(74) *Attorney, Agent, or Firm* — Manelli Denison & Selter, pllc; Edward J. Stemberg (57) ABSTRACT

A method of welding a window frame provides a welding system (10) having movable head fixtures (16). Certain of the head fixtures include cutting structure (37) and each head fixture includes heat supplying structure (40). A one-piece lineal (20) has first and second ends and notches therein. The lineal is loaded with respect to the head fixtures, with portions of the lineal being folded about the notches to define folded corners. Head fixtures are moved to clamp on the lineal. The cutting structure cuts the lineal generally at each notch to separate each of the folded corners from the lineal, with each corner of the lineal being defined by a pair of ends. The head fixtures are repositioned so as to provide a space between each pair of ends. A heat supplying structure is inserted into the space to heat each pair of ends and then removed. The head fixtures are moved so that each pair of ends contact and join in a thermally welded manner.

12 Claims, 7 Drawing Sheets

CORNER JOINERY SYSTEM AND METHOD FOR PVC WINDOWS AND POLYMERIC SUBSTRATES USED IN BUILDING PRODUCTS

This application claims the benefit of the earlier filing date of U.S. Provisional Application No. 60/996,781, filed on Dec. 5, 2007, which is hereby incorporated by reference into this specification.

TECHNICAL FIELD

This invention relates to systems and methods for the manufacture of windows. More specifically, this invention relates to systems and methods used for efficient production and improved processes for window systems, vinyl gates and other products manufactured from polymeric components.

BACKGROUND

Window systems are available in a wide range of sizes, shapes, and styles, such as, for example, French, casement, pivoting, sliding, folding, and sash windows. In conventional window systems, the window pane is enclosed by a first frame referred to herein as a "sash." The sash may slide along tracks formed in a supporting frame or "casing," or may be attached with hinges to the sides of the casing. Thus, the term "frame," as used herein, may refer to a sash or a casing. The sash in a rectangular hinged window system typically includes a top horizontal rail, lower horizontal rail, vertical hanging stile and vertical locking stile. The casing similarly includes a top horizontal rail or "head," lower horizontal rail or "sill," and vertical side members or "jambs".

These various frame components are typically sectioned from longer lineal material (e.g., vinyl or aluminum extrusions) into separate components that will then be aligned and attached together. Sectioning of these separate components typically includes cutting entirely through the lineal material at two opposite angles producing numerous pie-shaped scraps and other scraps and resulting in a significant cumulative waste of the lineal material.

Furthermore, excessive operator time and equipment set-up and handling are typically required to properly align and thermally join each of the joints of the sash and casing. The separate components must be loaded independently and are susceptible to improper assembly configuration, i.e., Single Hung, Horizontal Slider or Picture window which can result in waste. When the profiles are loaded, they are typically aligned using fixtures configured for the profile shape and geometry. After loading, the operator must manually step through a welder program to initiate the cycle. Once aligned, typically the components are connected by thermally welding with a single-point, two-point or four-point thermal welder at the respective corner joints. In some cases, the corner joints in these window systems are, or may be glued or chemically bonded as known in the window industry. More importantly, the fabricators in the industry use optimization software to reduce the amount of drops (cut offs) and waste however, because the fabricator is forced to segregate the lineal(s) they not only create consumable waste out of the pie cut, they also lose important material calculations that enhance the optimization process, thus reducing the algorithms and the percentages of useful product.

Another important factor in efficiency, quality and through-puts are the fact that in most every case the operator is not marrying or conjoining sibling extrusions but is joining cuts from separate batches of materials. All extrusions cure differently and have variable geometric dimensions causing inaccurate marriage between conjoined parts and reducing the overall windows performance.

SUMMARY

There is need for a more efficient, cost-effective, and improved system and method of forming and joining frame components for use in window systems.

An object of the invention is to fulfill the need referred to above. In accordance with the principles of the present invention, this objective is achieved by a method of welding that provides a one-piece lineal having first and second ends and at least one notch therein. The lineal is folded about the notch to define a folded corner. The lineal is cut generally at the notch to separate the folded corner from the lineal thereby defining a pair of ends. Thermal energy is transferred to the pair of ends. The pair of ends is then moved into contact to join the pair of ends in a thermally welded manner.

In accordance with another aspect of an embodiment, a method of welding a window frame or sash provides a welding system having movable head fixtures with certain of the head fixtures including cutting structure and each head fixture including heat supplying structure. A one-piece lineal is provided that has first and second ends and notches therein. The lineal is loaded with respect to the head fixtures, with portions of the lineal being folded about the notches to define folded corners. One of the certain head fixtures is associated with each folded corner. At least some of the head fixtures are moved to clamp on the lineal. The cutting structure of the certain head fixtures is employed to cut the lineal generally at each notch to separate each of the folded corners from the lineal, with each corner of the lineal being defined by a pair of ends. The head fixtures are repositioned so as to provide a space between each pair of ends and each pair of ends is aligned. Heat supplying structure is inserted into the space to transfer thermal energy to each pair of ends and is then removed. The head fixtures are moved so that each pair of ends contact and join in a thermally welded manner.

In accordance with yet another aspect of an embodiment, a method of welding provides a plurality of lineals having ends. Ends of the lineals are welded in a butt joined manner to define an elongated lineal structure. The lineal structure is cut to define lineal parts having mating ends. The lineal parts are moved into a certain configuration while ensuring that the mating ends remain adjacent. Thermal energy is transferred to the mating ends. The adjacent, mating ends are moved into contact to join the mating ends in a thermally welded manner.

In accordance with still another aspect of the embodiment, a window frame or sash welding system includes at least two movable head fixtures constructed and arranged to releasably clamp on a lineal. The lineal has at least two notches therein so as to define at least two folded corners at the notches while clamped by the head fixtures. Cutting structure is associated with at least certain of the head fixtures and is constructed and arranged to cut the lineal generally at each notch to separate each of the folded corners from the lineal, with each corner of the lineal being defined by a pair of ends. Heat supplying structure is associated with each head fixture and is constructed and arranged to be removably disposed between each pair of ends to transfer thermal energy to each pair of ends for joining each pair of ends in a thermally welded manner.

Other objects, features, functionality and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXAMPLE EMBODIMENTS

Figure 1:
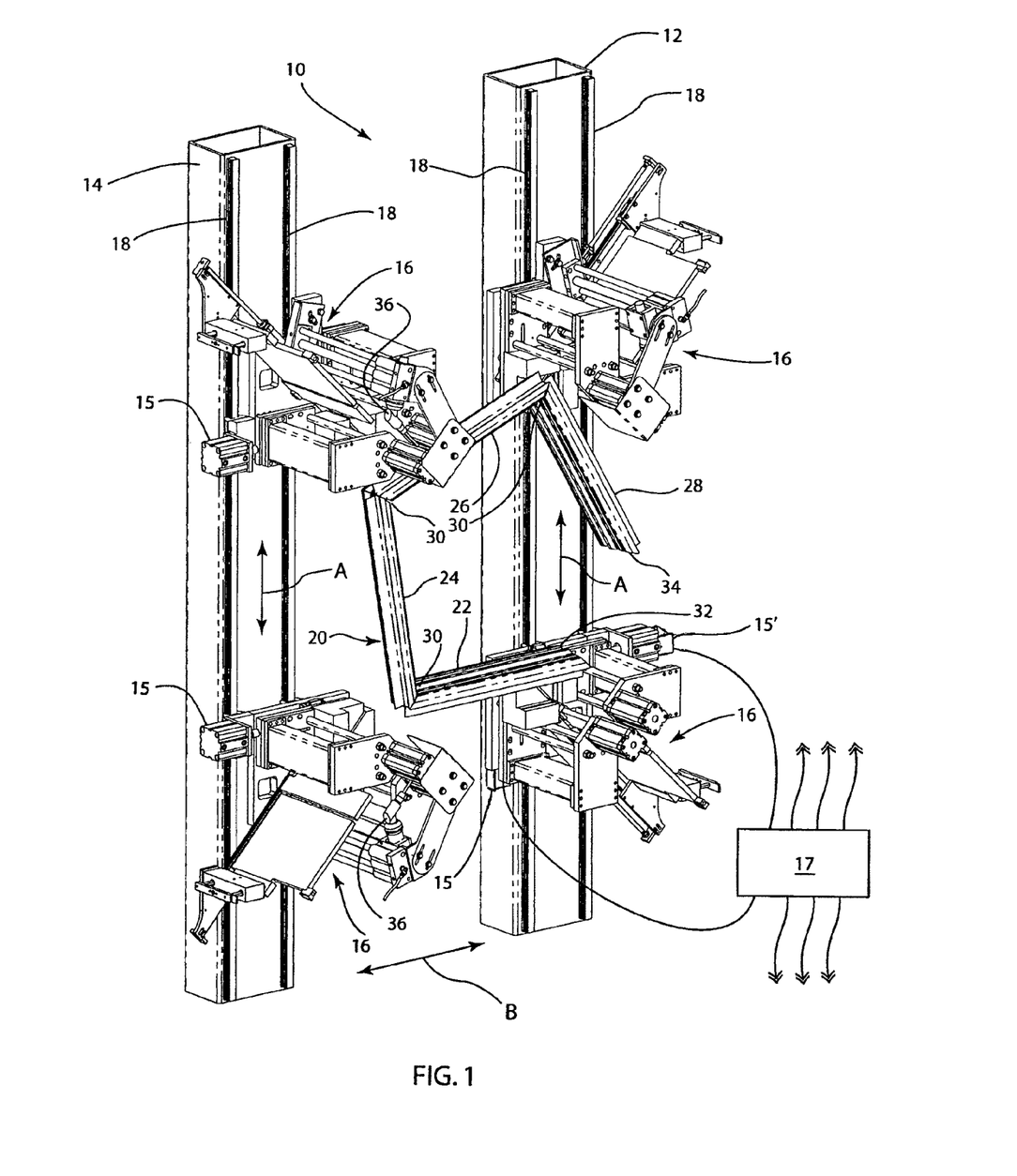
FIG. 1 is a view of a corner joinery system shown with a notched lineal being loaded therein in accordance with an embodiment of the invention.

With reference to FIG. 1, a corner joinery or welding system is shown, generally indicated at 10, in accordance with an embodiment of the invention. The system 10 includes a pair of head mounts 12, 14 disposed in spaced relation. Two welding head fixtures, generally indicted at 16, are mounted on each head mount 12 and 14. Thus, in the embodiment, there are four welding head fixtures. Each welding head fixture 16 is mounted on rails 18 of the respective head mounts 12, 14 so that the welding head fixtures 16 may move, preferably via a conventional servo actuator 15, in the directions indicated by arrows A in FIG. 1. A second conventional servo actuator 15' is associated with each head fixture 16 to move each head fixture 16 in the directions of arrows B in FIG. 1. Directions A and B are transverse with respect to each other. A controller 17 is programmed to provide the appropriate signals to the actuators 15, 15' to cause movement of the head fixtures 16, respectively. The function of these movements will be explained below. It is noted that although each head fixture 16 is moved by actuators 15 and 15', the actuators 15 and 15' (and controller 17) are only shown associated with the head fixture 16 at the bottom right hand side of FIG. 1 for ease of illustration.

With reference to FIG. 1, a lineal, generally indicated at 20, is shown being loaded into the system 10. The operator can actuate a start button on the system and the system 10 will open to a preset dimension based on the schedule of windows to be loaded. In the embodiment, the lineal 20 is a one-piece window component having four generally elongate sections 22, 24, 26 and 28. Notches 30 are provided at three locations in the lineal 20 so that when folded about the notches 30, three folded corners 35 are defined in the lineal 20. The fourth corner 35' is defined by abutting ends 32 and 34 of the lineal 20, thereby defining a closed structure. The notched and folded lineal 20 is of the type described in U.S. Pat. No. 7,117,576, the content of which is hereby incorporated by reference into this specification. The controller 17 receives the nominal size of the window and a formula of loading offsets for the window assembly process.

Figure 2:
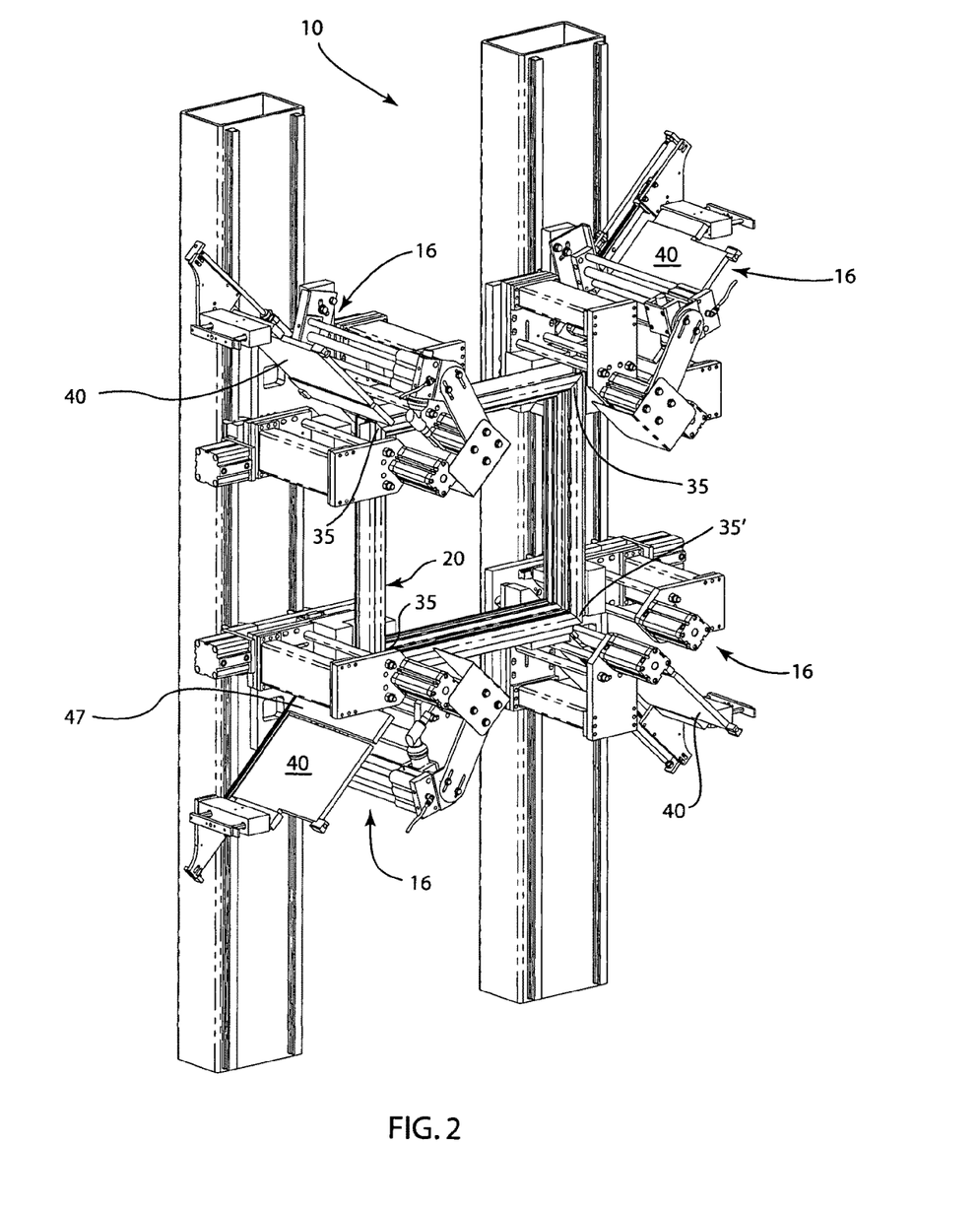
FIG. 2 is a view of the system of FIG. 1, with the lineal shown completely loaded against welding head fixtures.
Figure 3:
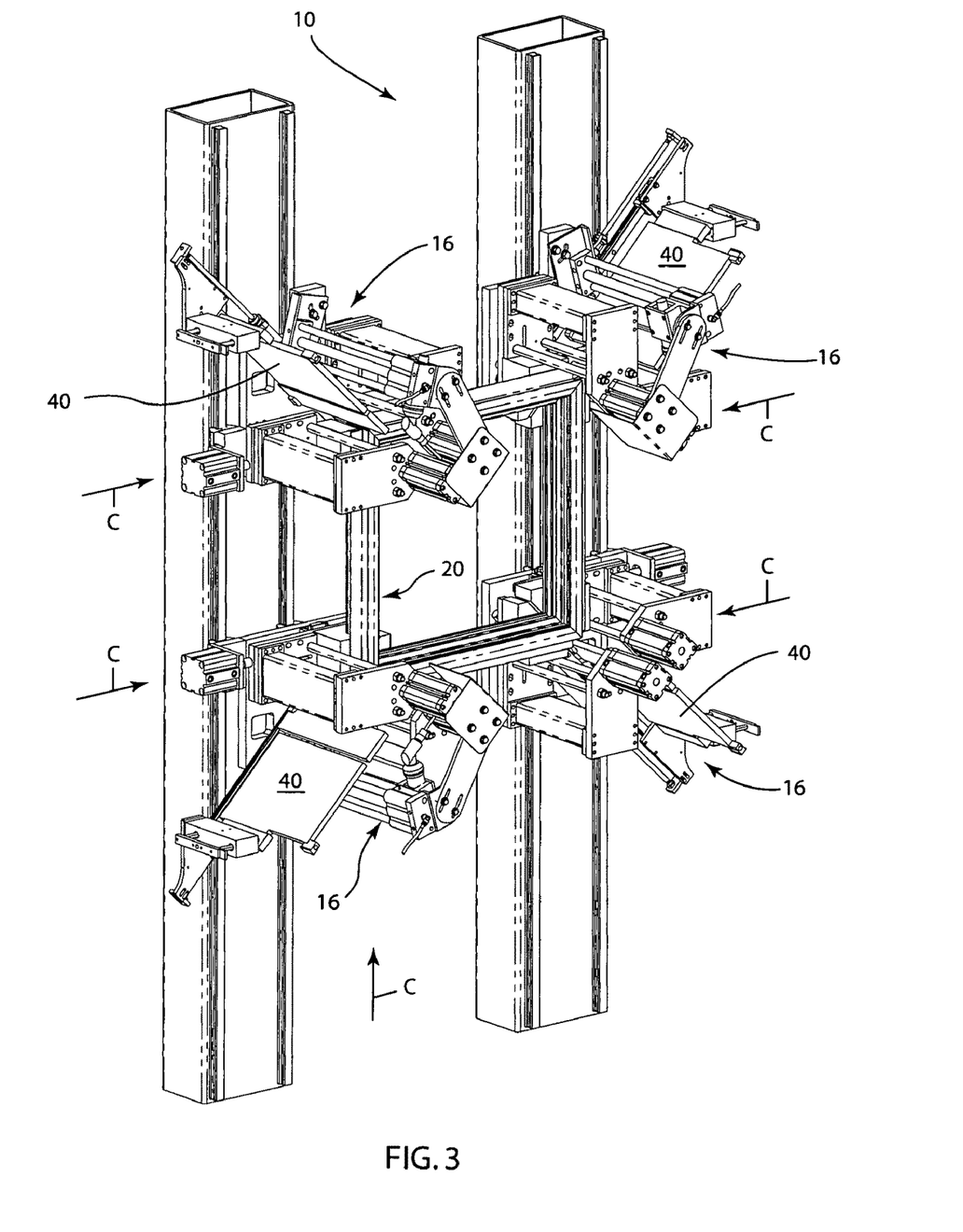
FIG. 3 is a view of the system of FIG. 2 shown with the welding head fixtures moved to square the lineal.

FIG. 2 shows the lineal 20 fully loaded into the system 10 with the lineal 20 having four corners 35, 35' to define a generally rectangular window component frame. As shown, each corner 35, 35' is positioned against an associated welding head fixture 16. FIG. 3 shows the steps of moving, via the actuators 15, 15', the welding head fixtures 16 in the directions of the arrow C to clamp on the lineal 20 and square the lineal 20.

Figure 4:
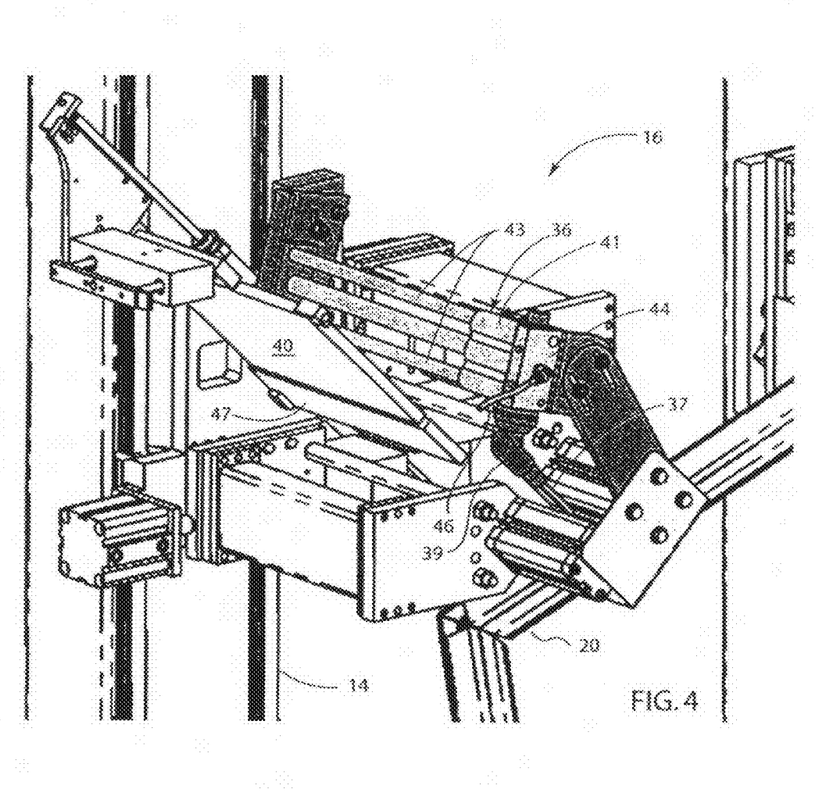
FIG. 4 is an enlarged view of a welding head fixture of FIG. 1 showing a cutter in a retracted, inoperable position.
Figure 5:
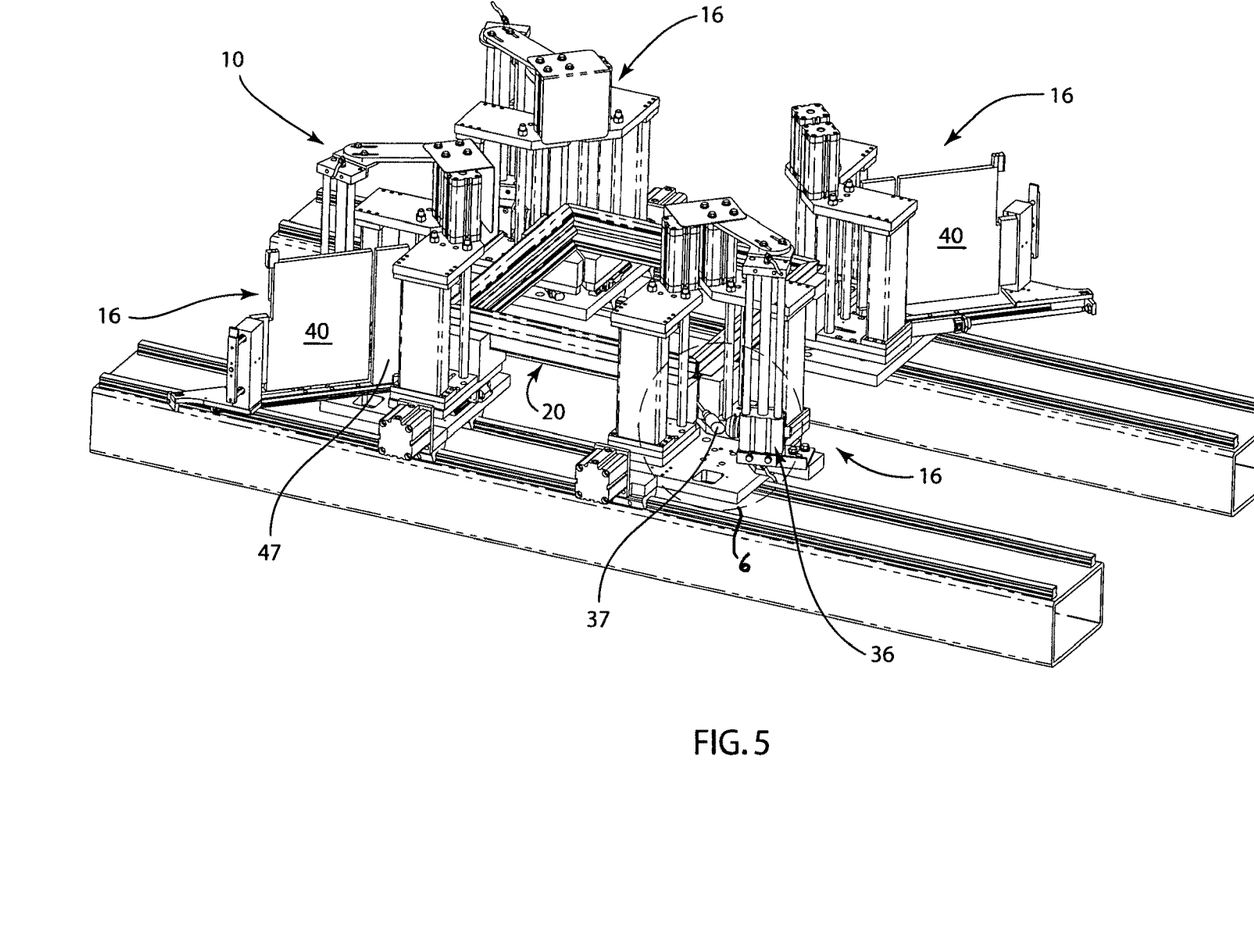
FIG. 5 is a view of the system of FIG. 3, shown with the cutters moved to an extended, operable position with the cutters passing through the lineals to perform a shearing operation.
Figure 6:
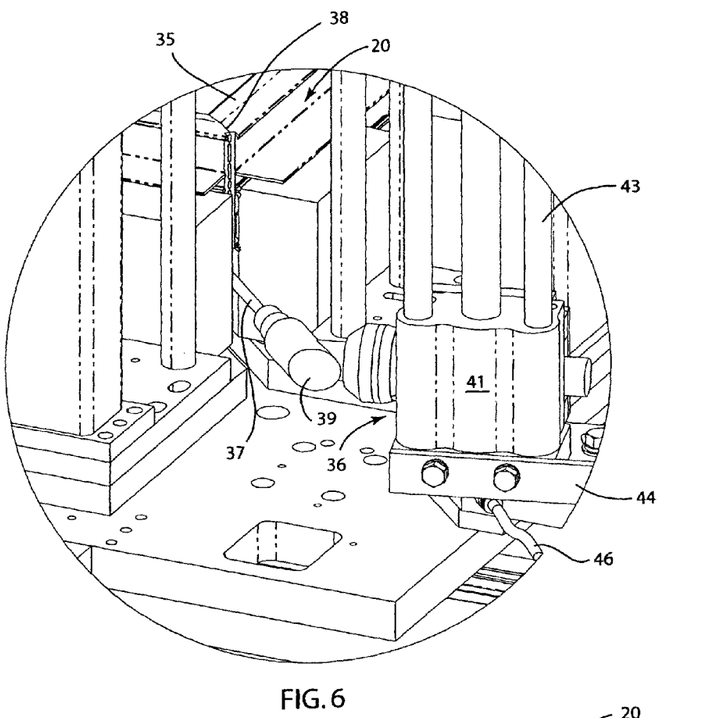
FIG. 6 is an enlarged view of the portion encircled at 6 in FIG. 5.
Figure 7:
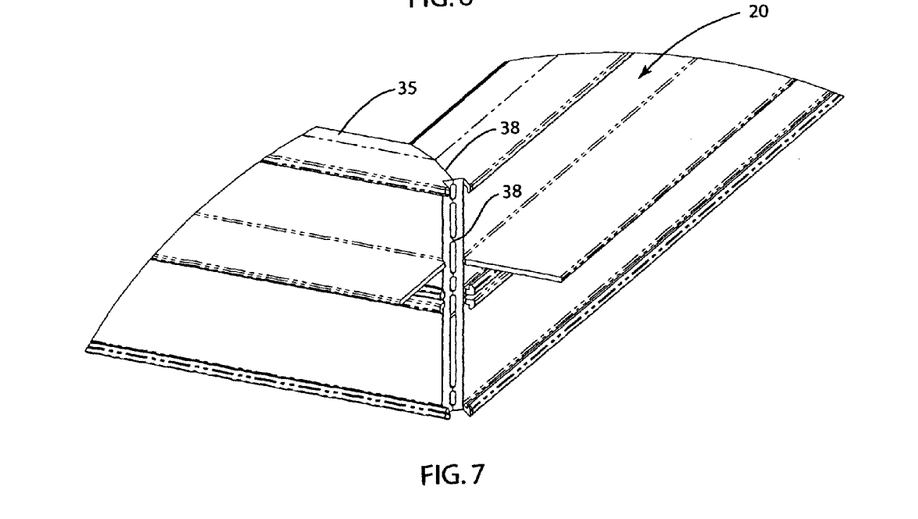
FIG. 7 is an enlarged view of a corner of the lineal of FIG. 6 shown sheared by a cutter.

FIG. 4 shows an enlarged view of a welding head fixture 16 disposed in the position of FIG. 1. Each welding head fixture 16 associated with a folded corner 35 includes a cutter structure, generally indicated at 36, having a cutter or blade 37 coupled with a 120° die grinder 39, that are mounted to a bracket 41 that is movable linearly along posts 43. Each bracket 41 is preferably moved by an air cylinder 44 that is supplied with air via an air inlet line 46. The encircled portion of FIGS. 5 and 6 shows the cutter 37 after cutting the three folded corners 35, thereby defining a cut 38 to separate the lineal 20 at each folded corner 35. It is noted that a heat plate 40 is not shown in the encircled portion of FIGS. 5 and 6 for clarity of illustration of the cutter 37. Thus, the single lineal 20 now defines four separate pieces. By performing the cutting operation while the lineal 20 is still in the system 10, the piece positions and the relationship with the sibling corner piece are advantageously maintained. Although a blade type cutter is shown, it can be appreciated that any type of cutter that can cut window frames or sashes can be used such as, for example, thermal knives, centrifugal blades, end milling, reciprocating saws, etc.

Next, the welding head fixtures 16 are repositioned without losing grip on the lineal 20. This is achieved by controlling the actuators 15, 15' associated with each welding head fixture 16 to move the welding head fixtures 16 to a formulated position outwardly from the lineal 20 enough to loosen the fixtures 16 on the pieces of the lineal 20 while maintaining hold on the lineal pieces. Locating or squaring structure such as plate 47 (FIG. 4) is then inserted between the cut ends of the lineal 20 so as to properly align the two profiles.

Figure 8:
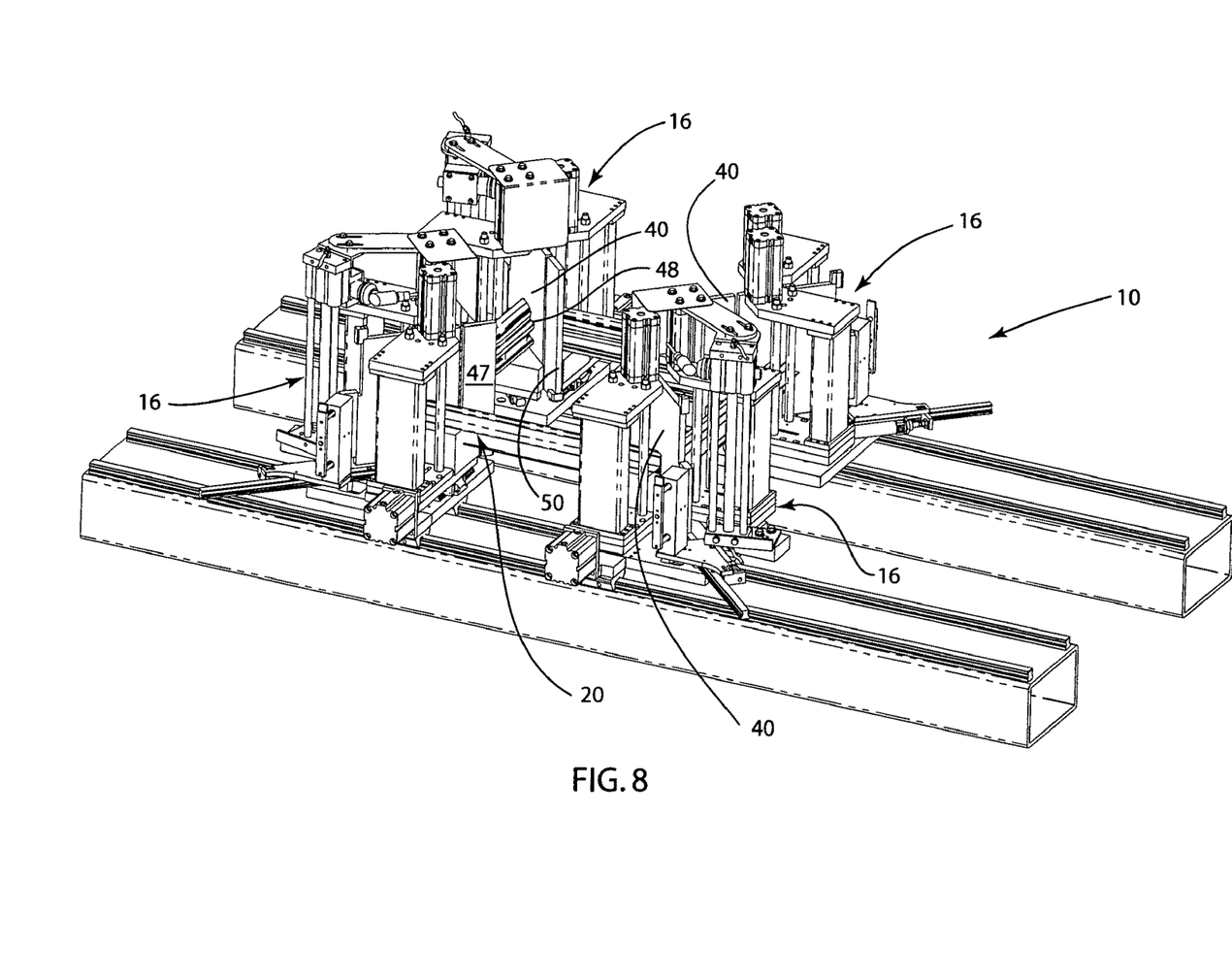
FIG. 8 is a view of the system of FIG. 5 shown with the end cuts of the lineal pushed against heat plates to produce a butt joint at each corner of the lineal.

Each fixture 16 includes a heat supplying structure, preferably in the form of a heat plate 40 for thermal welding of the cut ends of each corner of the lineal 20. Thus, once the fixtures 16 have been moved to the loosened position to define a space between the cut ends, a heat plate 40 is extended to an operative position adjacent to a respective corner 35, 35'. Next, as shown in FIG. 8, the fixtures 16 are moved to push the eight cut ends of the lineal 20 against the associated heat plates 40. Thus, a heat plate 40 is disposed in the space between each pair of ends, e.g., 48 and 50, of the separated lineal 20 at each corner. The heat plates 40 are heated (e.g. by current) and thermal energy is transferred from the heat plates to the lineal 20. Next, the heat plates 40 are retracted to an inoperable position and the fixtures 16 are moved to hold the ends, e.g., 48, 50, together, thereby defining a sealed butt joint upon cooling.

Once the cooling time has been reached, the system 10 is placed in an unload mode, opening the fixtures 16 to the nominal size plus an offset to remove the frame 20. The frame 20 is now suitable for holding and retaining glass or other similar transparent or semi-transparent material. Once the frame 20 is removed, the next lineal can be loaded.

Although a rectangular fame 20 has been disclosed, it can be appreciated that the system 10 can be configured to join cut ends of frames that are of different geometrical shapes, such as, for example, triangular, octagonal, etc, by providing the appropriate number of notices in the lineal and the appropriate number of fixtures 16. With shapes other than rectangles, the corners defined would be other than 90° corners. Furthermore, it can be appreciated that the system 10 can be oriented vertically or horizontally.

In addition, the system 10 need not produce a closed structure. For example, a lineal 20 with two notches to define two corners producing a U-shaped sash with first and second ends. Third and fourth corners can be defined by coupling a second lineal with either 45 or 90 degree angled ends to the first and second ends of the U-shaped sash in abutting relation, thereby defining a generally rectangular or square frame structure. Since a notched lineal 20 is used, waste is reduced.

Instead of notching, folding and cutting the lineal 20 as described above, a plurality of lineals can be provided with ends butt welded together in a generally continuous daisy chain fashion to define an elongated lineal structure. The lineal structure is cut (such as using a miter cut) inline to define lineal parts having mating ends. Thereafter, the lineal parts are moved into a certain configuration (e.g., frame shape) while ensuring that the mating ends remain adjacent. The adjacent mating ends are then thermally welded by using, for example, a heat plate. The cutting, moving and welding can be done in an inline fashion such as on a common assembly line, for example using one or more head fixtures. Thus, there is no need to move the cut lineal parts to a welding station which can result in sibling cut ends not being joined together and instead being joined to non-sibling ends. In either method described herein, since each cut end of the lineal remains with its sibling, quality and through-puts are is increased.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method of welding a window frame or sash comprising:
   providing a welding system having movable head fixtures, certain of the head fixtures including cutting structure and each head fixture including heat supplying structure,
   providing a one-piece lineal having first and second ends and notches therein,
   loading the lineal with respect to the head fixtures, with portions of the lineal being folded about the notches to define folded corners, one of the certain head fixtures being associated with each folded corner,
   moving at least some of the head fixtures to clamp on the lineal,
   employing the cutting structure of the certain head fixtures to cut the lineal generally at each notch to separate each of the folded corners from the lineal, with each corner of the lineal being defined by a pair of ends,
   repositioning the head fixtures so as to provide a space between each pair of ends,
   aligning each pair of ends,
   inserting one of the heat supplying structures into each space to transfer thermal energy to each pair of ends,
   removing the heat supplying structures, and
   moving the head fixtures so that each pair of ends contact and join in a thermally welded manner.

2. The method of claim 1, wherein the step of loading the lineal includes defining an abutted corner by placing the first and second ends in generally abutting relation, thereby defining a closed structure, with the first and second ends defining a said pair of ends.

3. The method of claim 2, wherein the step of providing the lineal includes providing the lineal to include three notches therein defining three folded corners and the one abutted corner so as to define a generally rectangular closed structure, and the step of providing the system includes providing one head fixture associated with each of the four corners.

4. The method of claim 3, wherein the certain head fixtures that include the cutting structure are associated with the three folded corners.

5. The method of claim 1, wherein the steps of moving and repositioning the head fixtures include providing actuators associated with each head fixture and providing a controller to control the actuators.

6. The method of claim 1, wherein the step of employing the cutting structure includes moving a blade of each cutting structure to cut the lineal.

7. The method of claim 6, wherein the moving step includes moving the blade generally linearly.

8. The method of claim 7, wherein the step of moving the blade linearly includes using an air cylinder to move the blade.

9. The method of claim 1, wherein the repositioning step includes repositioning the head fixtures without losing clamping on the lineal to provide the space between each pair of ends.

10. The method of claim 1, wherein each heat supplying structure is a heat plate.

11. A method of welding comprising:
    providing a one-piece polymeric lineal having first and second ends and at least one notch between the first and second ends,
    folding the lineal about the notch to define a folded corner,
    cutting the lineal, while gripped in a fixture, generally at the notch to separate the folded corner from the lineal thereby defining a pair of ends,
    moving the fixture to provide a space between the pairs of ends without losing grip on the lineal,
    inserting a heat plate into the space,
    transferring thermal energy via contact with the heat plate to the pair of ends, and
    moving the pair of ends into contact to join the pair of ends in a thermally welded manner.

12. A method of welding comprising:
    providing a plurality of polymeric lineals having ends,
    welding ends of the lineals in a butt joined manner to define an elongated lineal structure,
    cutting the lineal structure, while gripped in a fixture, to define lineal parts having mating ends,
    moving the lineal parts into a certain configuration to provide a space between the pairs of ends without losing grip on the lineal and while ensuring that the mating ends remain adjacent,
    inserting a heat plate into the space,
    transferring thermal energy via contact with the heat plate to the mating ends, and
    moving the adjacent, mating ends into contact to join the mating ends in a thermally welded manner.

\* \* \* \* \*